United States Patent [19]
Santiago et al.

[11] Patent Number: 4,747,264
[45] Date of Patent: May 31, 1988

[54] PROCESS FOR THE AUTOMATIC REGENERATION OF A SOOT FILTER IN A PASSENGER VEHICLE HAVING A DIESEL ENGINE

[75] Inventors: Enrique Santiago, Diedorf; Peter Kugland, Friedberg; Alois Ullmer, Munich, all of Fed. Rep. of Germany

[73] Assignee: Zeuna-Srärker GmbH & Co. KG, Fed. Rep. of Germany

[21] Appl. No.: 939,159

[22] PCT Filed: Feb. 4, 1986

[86] PCT No.: PCT/EP86/00058
§ 371 Date: Oct. 8, 1986
§ 102(e) Date: Oct. 8, 1986

[87] PCT Pub. No.: WO86/04641
PCT Pub. Date: Aug. 14, 1986

[30] Foreign Application Priority Data

Feb. 9, 1985 [DE] Fed. Rep. of Germany ....... 3504461

[51] Int. Cl.⁴ ............................................. F01N 3/02
[52] U.S. Cl. ........................................ 60/274; 60/285
[58] Field of Search .......................... 60/274, 285, 286

[56] References Cited

U.S. PATENT DOCUMENTS

| 4,211,075 | 7/1980 | Ludecke | 60/285 |
| 4,450,682 | 5/1984 | Sato | 60/286 |
| 4,462,208 | 7/1984 | Hicks | 60/286 |
| 4,492,079 | 1/1985 | Takagi | 60/286 |
| 4,509,327 | 4/1985 | Enga | 60/285 |
| 4,522,027 | 6/1985 | Hasegawa | 60/274 |
| 4,566,271 | 1/1986 | French | 60/286 |

Primary Examiner—Douglas Hart
Attorney, Agent, or Firm—Brumbaugh, Graves, Donohue & Raymond

[57] ABSTRACT

In a process for the automatic regeneration of a soot filter in an exhaust line (11) of a diesel engine in a passenger vehicle, a throttle valve in the intake line is controlled by the following system logic. The speed (n) of the diesel engine (1), the back pressure (PVF), measured upstream of the soot filter (12), and the exhaust temperature are each compared with preset lower limit values (ng, PGU, TGU). The back pressure (PVF) is additionally compared with a preset upper limit value (PGO). When all measured variables lie above the limit values mentioned, the control device generates a signal "close throttle valve". The two limit values for the pressure, (PGU and PGO), are displaced with the speed (n) in accordance with their respective alteration.

10 Claims, 3 Drawing Sheets

PROCESS FOR THE AUTOMATIC REGENERATION OF A SOOT FILTER IN A PASSENGER VEHICLE HAVING A DIESEL ENGINE

The invention relates to a process for the automatic regeneration of a soot filter in an exhaust gas line of a diesel-internal combustion engine (diesel engine) in a passanger vehicle, using a throttle valve, operable by means of a control device, in the intake line in order to achieve an exhaust temperature corresponding to the ignition temperature of the soot accumulated in the soot filter in dependence on measured variables forming input signals for the control device, namely at least the speed of the diesel engine, the back-pressure of the soot filter and the exhaust temperature.

In a known system for regenerating a soot filter (U.S. Pat. No. 4,211,075), a throttle valve in the intake air line is controlled in such a manner that in certain operating conditions, as a result of closing the throttle valve and the resulting reduction in the air supply, the exhaust temperature rises, with the result that in a soot filter provided in the exhaust line the ignition temperature of the soot deposited there is achieved. By maintaining this condition for some minutes, it is possible to regenerate the soot filter in that the soot which has accumulated there is completely burned up.

It is a prerequisite in this system that during the regenerating process the engine is driven in the upper part-load range, which in a vehicle drive means either at a high speed or when overcoming a gradient. In the lower part-load range on the other hand, the exhaust temperatures required for igniting the soot accumulated in the filter are not normally achieved; in order in this case also to permit a periodic regeneration, additional heating devices are provided. In the known system, the throttle valve position is controlled by a microcomputer, the input signals of which correspond to the following measured variables: accelerator pedal position, engine speed, exhaust temperature upstream of the soot filter, temperature inside the soot filter. The regenerating process may be initiated automatically or by hand. A variable control of the throttle valve taking into account the measured variables mentioned, is intended to ensure that, for the protection of the soot filter, the filter temperature does not exceed a specific maximum value, and that there is a lower excess of oxygen in the exhaust gas for the suppression of smoke while the soot which has accumulated in the soot filter is burnt off.

In a purely temperature-dependent control of the regenerating process, there is a risk that at full load or, if excluded by a protective function, at operating states in the upper part-load range, uncontrolled regenerations will commence, which moreover are not dependent on the actual contamination of the filter. Frequent regeneration processes mean, however, a higher fuel consumption and greater contamination of the soot filter. In addition, when the engine is in overrun operation with the throttle valve open, high filter temperatures may occur even when the filter is empty, and thereby initiate unnecessary and unwanted regenerating processes.

In contrast, in a process of the type mentioned in the introduction, the present invention is based on the problem of achieving a controlled, automatic regeneration of the soot filter dependent on defined operating conditions of the car, a specific discharged state of the soot filter being achieved once a regeneration process has ended.

This problem is solved in accordance with the invention by the following system logic:

1. The speed n of the diesel engine, the back pressure PVF measured upstream of the soot filter and the exhaust temperature are each compared with present lower limit values ng, PGU, TGU.

2. The back pressure PVF is additionally compared with a preset upper pressure limit PGO.

3. When all measured variables lie above the limit values mentioned, the control device generates a signal "close throttle valve".

4. The two limit values for the pressure, PGU and PGO, are shifted with the speed (n) in accordance with their respective alteration.

By fixing lower limit values for the speed, the back pressure measured upstream of the soot filter and the temperature in the exhaust, it is possible to ensure that a regeneration only takes place when all associated measured values lie above these lower limits. As far as the back pressure is concerned, then for the release of the signal "close throttle valve" an upper limit pressure PGO has to be exceeded. This ensures that each regeneration is continued to the end, that is to say, is only complete when the back-pressure PVF has again fallen below not only the upper limit pressure PGO but also the lower limit PGU. It is essential that fluctuations in pressure of PVF between PGO and PGU do not affect the continuation of the regeneration in any way, that is to say, do not lead to an interruption thereof. If the regeneration is interrupted, for instance because a different limit value, e.g. the limit speed ng is fallen below, then once such an interruption has ended the regeneration is continued until the back pressure PVF falls below the lower pressure limit PGU.

Because of the dependence of the back pressure on the speed, the said aim is fully achieved only as a result of the two pressure limits PGU and PGO being shifted in dependence on the speed (n). Moreover, the pressure limits are dependent on the individual structural design of the engine.

Assuming that the exhaust temperture TNF is measured downstream of the soot filter and is compared with the lower limit value TGU, since the former corresponds most closely to the temperature in the soot filter, for a practical example the following limit values determined by experiment with a 2.4 l diesel engine may be assumed:

ng = 2,000 rev/min.
TGU = 270° C.
PGO = 150 mbar (idling)
PGU = 20 mbar (idling).

The limiting temperature TGU (here 270° C.) was set in that, starting from its level, by closing the throttle valve the ignition temperature for burning off the soot in the soot filter, which is about 430° to 470° C., is achieved. Of course, this temperature does not occur in the lower part-load range; the TGU-value mentioned ensures, however, that the regeneration conditions can also be achieved even when the car is driven in town traffic.

As a further measured variable the load on the diesel engine should be allowed for in that the full load operation excludes the generation of the signal "close throttle valve" permitting regeneration, or generates the opposite signal "open throttle valve". This feature ensures that in full-load operation, regardless of the particular pressure, temperature and speed values, the throttle valve is open so that if necessary the full engine capacity can be made available.

Suppressing the regeneration in this manner at full load is achieved in practice in that a full-load switch coupled to the injection pump of the diesel engine is closed, as a result of which the signal "open throttle valve" is generated, this signal being maintained even when the full-load switch is opened for only a brief moment; a guide value for a brief opening of this kind may be a duration of approximately two seconds. The point here is that the full-load switch is coupled to a correspondingly rated switch-off delay, so that when the full-load switch is briefly opened, that is to say, when the driver decelerates briefly, the throttle valve nevertheless remains open, so that during such a full load operation a regeneration is effectively suppressed.

In order to exclude uncontrolled regenerations which could lead to the soot filter being destroyed, to protect the soot filter from overheating provision is made for the measured exhaust temperature TNF or the temperature difference DTF=TNV-TVF*, referring to both sides of the soot filter, to be compared with a protection temperature TSF or with a protection temperature difference DTS, and for the signal "close throttle valve" to be generated when the protection temperature values are exceeded.

*Presumably this should be "DTF=TNF-TVF"—translator.

This protective function is important particularly for the transition from full load operation to overrun operation, since in this phase of operation, that is to say, when the throttle valve is already open, the engine draws in air at an undiminished rate, which may lead to a concentration of oxygen that is dangerous for the soot filter. Closure of the throttle valve in good time reduces the throughput of air or oxygen and prevents the soot filter from burning through.

In this connection, it may be advantageous to tie the time for which the temperature is exceeded to a specific interval of, for example, one minute after the full load signal has ended. The protective function would not therefore occur if the temperature rises only after a longer interval. In this case the signal "close throttle valve" is only generated when the other limit values (ng, PGO) also have been exceeded.

Tying the time to the full load signal can be dispensed with if the protective function is linked to the temperature difference TNF-TVF, since in this case the temperature TVF upstream of the soot filter takes direct account of the influence of the incoming fresh air, and the temperature TNF downstream of the soot filter takes direct account of the state of contamination of the filter.

Within the scope of the invention, provision is made for the throttle valve to assume not only the two end positions, namely "open" and "closed" (the throttle valve in the closed position naturally not closing off the intake line), but for the throttle valve to be set at any intermediate position such that, depending on the load of the engine, a certain oxygen excess is always maintained, as a requirement for preventing the development of a considerable amount of soot in the exhaust during the regeneration.

The process according to the invention is explained below with reference to the drawing, in which FIG. 1 shows a diagrammatic view of a diesel engine with soot filter and control device;

Figure 1:
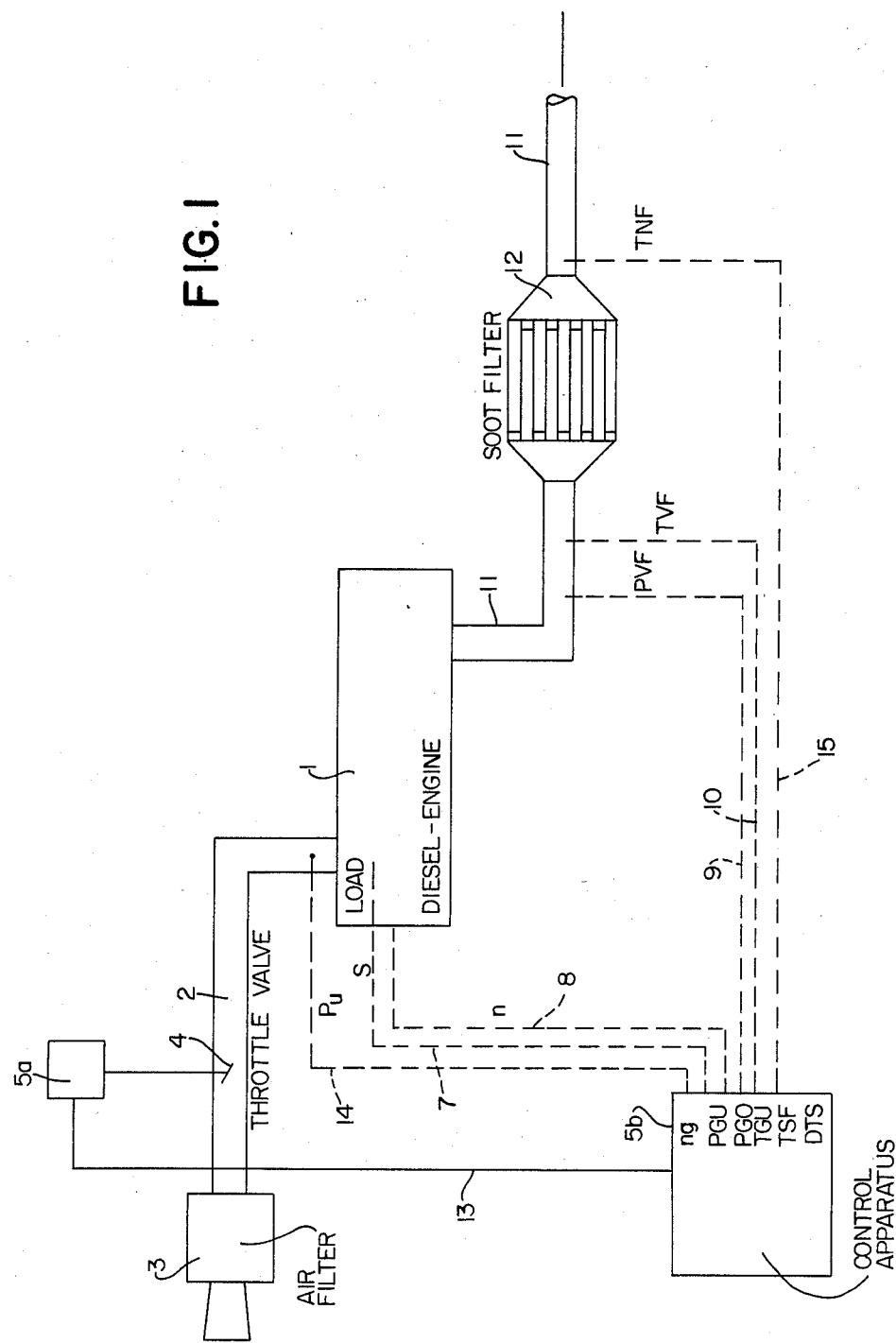

According to FIG. 1, a diesel engine 1 is connected to an air filter 3 by way of an intake line 2. In the intake line 2 there is a throttle valve 4 controlled by a pulse generator 5a acting on a correcting motor, the control pulses to the pulse generator 5a being generated by a control apparatus 5b connected to this by way of a signal line 13; the control apparatus 5b operates automatically, since it would not be reasonable to expect the driver of the car to operate the throttle valve manually for the purpose of regenerating the soot filter 12 installed in an exhaust line 11.

On its input side, the control apparatus 5b is connected to the various measured variables, namely to a signal input 7 for the engine load S, e.g. corresponding to the accelerator pedal position or the lift of the injection pump, also to a signal input 8 for the engine speed n, a further signal input 14 for the vacuum PU in the intake line 2 downstream of the throttle valve 4, and finally to three further signal inputs to the exhaust line 11, namely a signal input 9 for the pressure PVF measured upstream of the soot filter 12, a signal input 10 for the temperature TVF in the exhaust line 11 upstream of the soot filter 12 and finally a signal input 15 for the temperature TNF measured in the exhaust line 11 downstream of the soot filter 12.

The control apparatus 5b responds to the input signals in the signal lines 7 to 10, 14, 15 for the measured variables ascertained such that these are compared with corresponding desired values, namely, the speed n is compared with a limit speed ng, the pressure PVF is compared with a lower limit pressure PGU and an upper limit pressure PGO, and the temperature TNF is compared with a lower limit temperature TGU. Only when these measured values lie above their limit values is the signal "close throttle valve" generated and passed to the pulse generator 5a via the signal line 13.

In a variation, the temperature comparison may also be performed on the basis of the differential temperatures TNF-TVF=DTF, the measured temperature difference DTF being compared with a corresponding desired value DTG.

Allowance is made for the load signal S in that at full load the signal "close throttle valve" is excluded. The limit speed ng lies approximately at 2000 rev/min., that is, in the middle of the part-load range.

As a prerequisite for the signal "close throttle valve", the measured back pressure PVF must lie above the upper limit value PGO, wherein, after the throttle valve 4 has been closed, a drop in pressure to below the upper limit value PGO does not result in the regeneration being interrupted, provided that PVF>PGU.

The signal line 14 for the vacuum PU in the intake line 2 takes on a special role. This signal is needed for the correction of the throttle valve 4 by the pulse generator 5a, so that the throttle valve can be adjusted not only between "open" and "closed" by virtue of changes in the PU-signal, but may also assume any intermediate positions such that, as the PU value increases, the throttle valve is displaced in the "open" direction and vice versa for decreasing PU values. The aim of this correction of the throttle valve is to maintain a slight oxygen excess matched to the particular engine load. As an alternative (not shown), an oxygen probe supplementing or instead of the PU measurement could be considered.

For comparison of the temperature, it is sufficient for the temperature TNF downstream of the soot filter to be measured and compared with a limit temperature TGU. In order to protect the soot filter against overheating, it appears expedient to compare the temperature TNF measured downstream of the soot filter after the appearance of a preceding full load signal with a protection temperature TSF for the soot filter 12. The phase during transition from full-load operation to over-run operation represents a particular danger to the soot filter, because, when the filter is still hot, the throttle valve stands in the "open" position so that the engine is able to take in air at an undiminished rate, which may lead to a dangerous excess of oxygen in the soot filter.

Instead of the logic operation of the temperature comparison
TNF>TSF,
measured approximately within one minute of the end of the last full load signal, the temperature difference TNF−TVF=DTF may also be measured, DTF being compared with the desired value of a protection temperature difference DTS according to the relation DTF>DTS.

For this comparison of differential temperatures, a time dependency can be dispensed with, as the temperature characteristic TNF is analogous to the temperature in the soot filter and the temperature characteristic TVF is analogous to the respective position of the throttle valve.

Figure 2:
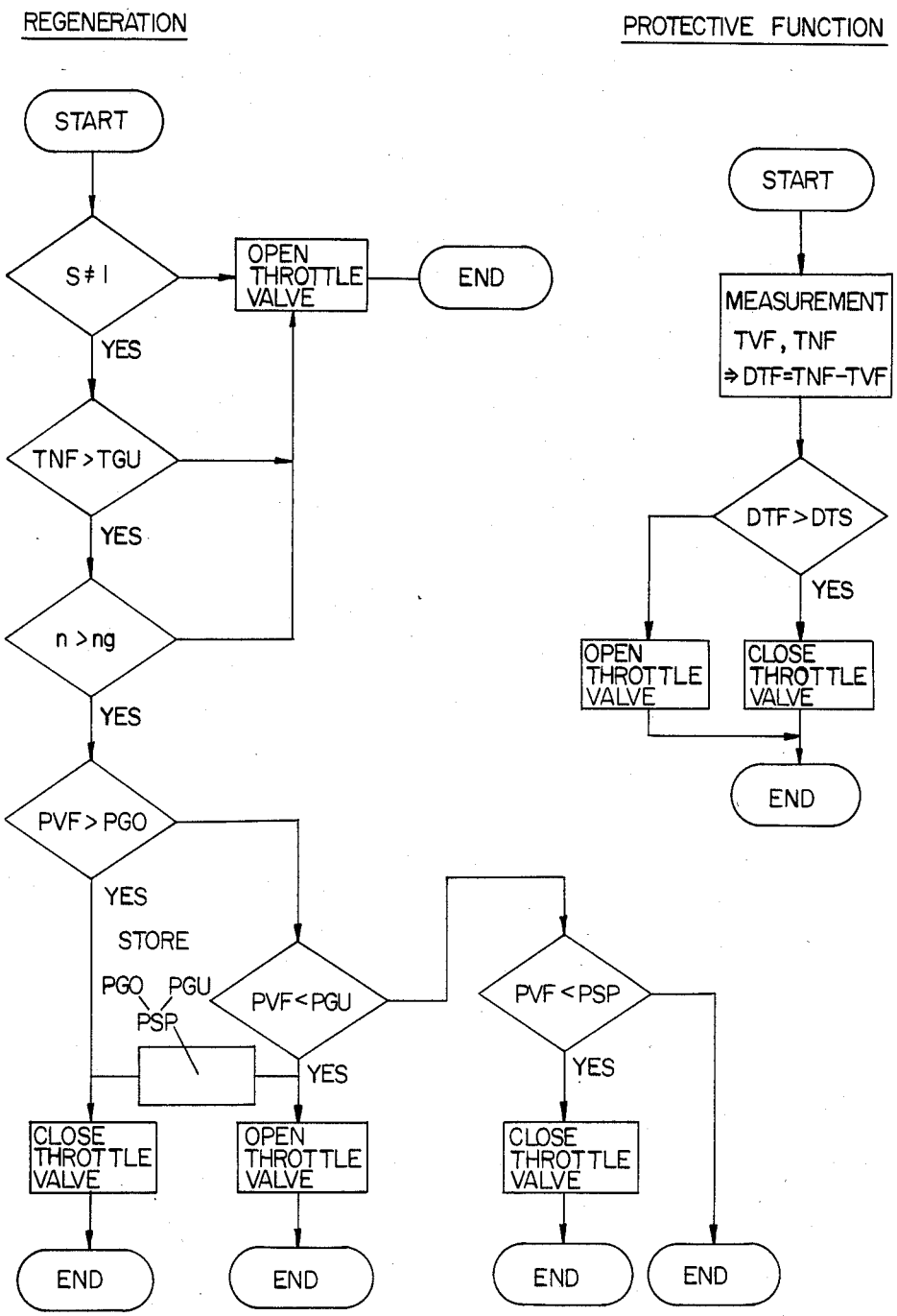
FIG. 2 shows a flow chart for the function of the control device.

The flow chart illustrated in FIG. 2 explains the manner in which the control apparatus 5b functions. This flow chart is clear to the expert. It shows two sequences, namely "regeneration" and "protective function", the latter building on the above-described comparison of the temperature differences with measured values upstream and downstream of the soot filter. With regard to the regeneration sequence, it should be added that, during part-load (S=1) at the three-stage comparison of limit values TNF>TGU, n ng* and PVF>PGO, the signal "close throttle valve" appears immediately, namely if all measured values lie above their respective limit values. For the pressure comparison, the stored desired value corresponds either to the lower limit value PGU or to the upper limit value PGO. The desired value may be set by digital means or in accordance with a hysteresis element.
*This should presumably be "n>ng"—translator.

If the pressure drops below PGO, while all other measured values lie above their respective limit values, the regeneration is nevertheless continued provided that the relation PVF>PGU applies to the back pressure of the soot filter PVF. Once the regeneration has been initiated, the stored desired value for the pressure is changed, PGO being replaced by PGU. If the back pressure subsequently drops below PGW*, then the stored desired value is again changed to PGO. Not until PGO is again exceeded can a new regeneration cycle commence.
*Presumably "PGU"—translator.

Figure 3:
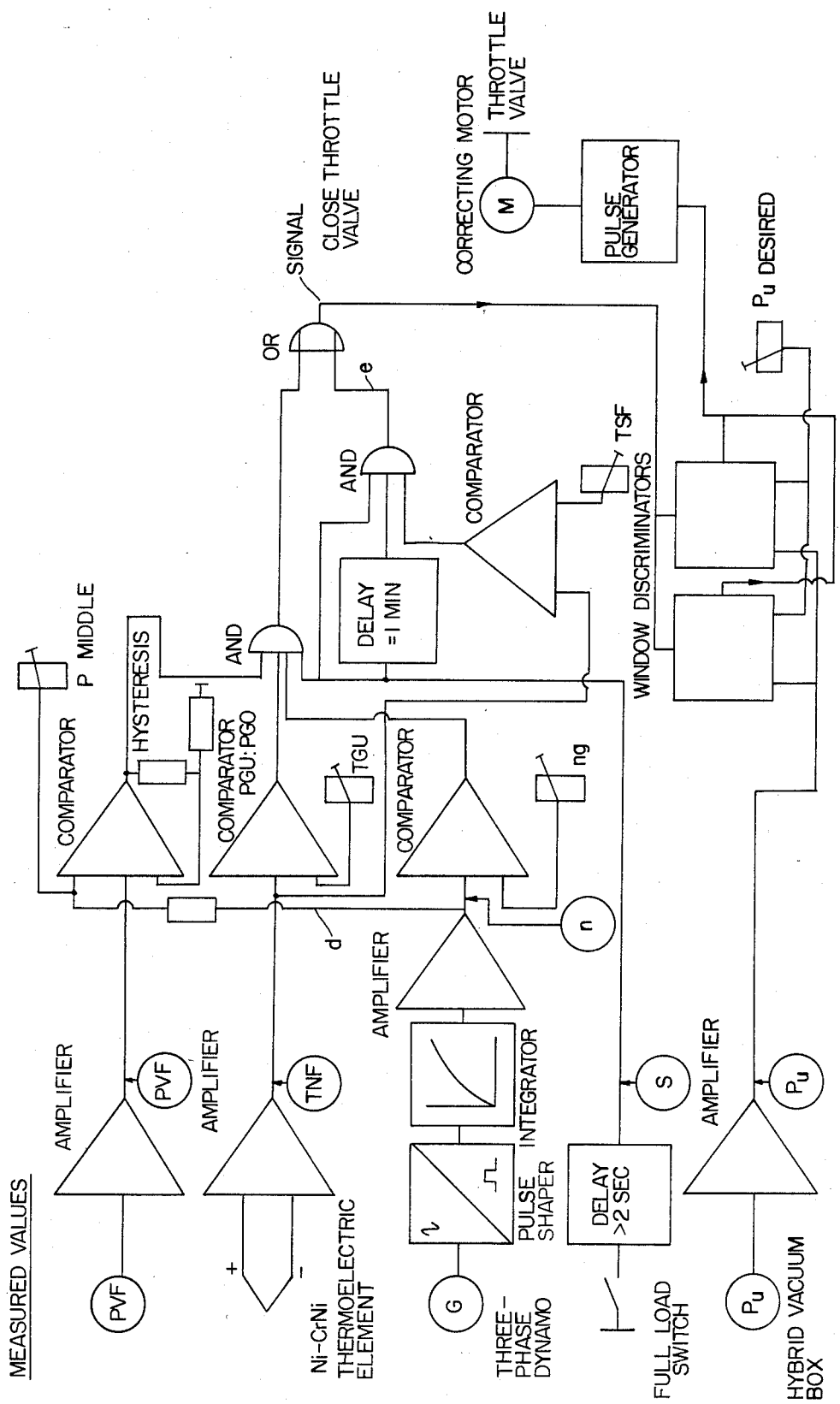
FIG. 3 shows a simplified block diagram for the circuitry of the control device.

The block diagram according to FIG. 3 shows, from left to right, first of all the recording of measured values, the amplification of the measuring signal, its comparison with the stored limit values and finally the determination of the control signal "close throttle valve" by an AND-element and a downstream OR-element, the second input e of which corresponds to the protective function determined by temperature comparison.

To denote the limit values, the notation of FIG. 2 has been used, and in addition the individual circuit parts have been provided with explanations so that the circuit of the control apparatus shown in simplified form in FIG. 3 is clear. With regard solely to the vacuum measurement, it should be added that the signal "close throttle valve", before reaching the pulse generator for the correcting motor M for the adjustment of the throttle valve, is further regulated by way of two window discriminators which each have an input for the vacuum signal PU and an second input for the desired value of the vacuum, PU-desired. By means of the two window discriminators, a rapid control behaviour is achieved in that, with a large deviation in the actual value of PU, the throttle valve is actuated at high speed, whereas with a smaller deviation in the actual value of PU a lower adjustment speed is used, the two speeds being determined by the two window discriminators.

The shifting of the two pressure limit values PGU, PGO, according to the speed n deserves special mention; to this end, the speed signal in the signal line d to the comparator for comparing pressure is branched off, coupled with a desired value P mean, regulated via a hysteresis circuit and finally compared with the measured value.

The stored value PSP entered in FIG. 2 corresponds in each case to one of the two limit values PGU, PGO of the hysteresis circuit. These limit values are in a specific fixed dependency upon P middle.

What is claimed is:

1. A process for the automatic regeneration of a soot filter in an exhaust gas line of a diesel-internal combustion engine (diesel engine) in a passenger vehicle, using a throttle valve, operable by means of a control device, in the intake line in order to achieve an exhaust temperature corresponding to the ignition temperature of the soot accumulated in the soot filter, said process comprising the steps of:
   (a) measuring variables in order to form input signals for the control device, said variables comprising at least the speed of the diesel engine, the back pressure of the soot filter and the exhaust temperature,
   (b) comparing the speed (n) of the diesel engine, the back pressure (PVF) measured upstream of the soot filter and the exhaust temperature with preset lower limit values ng, PGU, TGU, respectively,
   (c) additionally comparing the back pressure (PVF) with a preset upper limit value (PGO),
   (d) causing the control device to generate a signal "close throttle valve", when all measured variables lie above the said limit values, and shifting the two limit values for the pressure, (PGU and PGO) with the speed (n) in accordance with their respective alteration.

2. A process according to claim 1 including the step of measuring the exhaust temperature (TNF) downstream of the soot filter and comparing said exhaust temperature with the lower limit value (TGU).

3. A process according to claim 1 including the step of measuring, as a further variable, the load on the diesel engine, such that a full load operation input signal excludes the generation of the signal "close throttle valve", thus causing the control device to generate the opposite signal "open throttle valve".

4. A process according to claim 3 including suppressing regeneration at full load by the steps of providing a full-load switch coupled to the injection pump of the diesel engine, closing said switch in response to a full load signal, and thereby generating the signal "open throttle valve", and maintaining said "open throttle valve" signal even when the full-load switch is opened only briefly.

5. A process according to one of claims 1 to 4 including protecting the soot filter from overheating by the steps of comparing the measured exhaust temperature (TNF) or the measured temperature difference (DTF=TNF−TVF), referring to both sides of the soot filter, with a protection temperature (TSF) or with a protection temperature difference (DTS), and generating the signal "close throttle valve" when the protection temperature values are exceeded.

6. A process according to claim 1 including the step of controlling the throttle valve position by measuring, as a further variable, the vacuum (PU) and comparing said vacuum measurement with a preset desired value for the vacuum (PU-desired), before the signal "close throttle valve" is switched to a correcting element for the throttle valve position.

7. A process according to claim 6 including effecting the pressure adjustment in at least two stages in such a manner that high actual value deviations are compared at a high control speed and low actual value deviations are compared at a low control speed.

8. A process according to claim 6 or 7 wherein the desired value (PU-desired) is itself variable by being determined according to the load on the diesel engine.

9. A process according to claim 8 including determining the desired value (PU-desired) under three categories of load as follows:
    (a) PU-desired=x for continuous running,
    (b) PU-desired=x+y for deceleration (braking),
    (c) PU-desired=x−y for fast acceleration,
where x lies between 250 and 450 mbar. and y lies between 50 and 150 mbar.

10. A process according to claim 1 including generating the signal "close throttle valve", and thereafter not completing regeneration until the measured back pressure has fallen below lower limit value (PGU).

* * * * *